US012057959B2

(12) United States Patent
Konda et al.

(10) Patent No.: US 12,057,959 B2
(45) Date of Patent: Aug. 6, 2024

(54) DEVICE IDENTIFICATION

(71) Applicant: McAfee, LLC, Santa Clara, CA (US)

(72) Inventors: Tirumaleswar Reddy Konda, Bangalore (IN); Abhishek Tripathi, Bangalore (IN); Urmil Mahendra Parikh, Bangalore (IN); Dattatraya Kulkarni, Bangalore (IN)

(73) Assignee: McAfee, LLC, San Jose, CA (US)

( * ) Notice: Subject to any disclaimer, the term of this patent is extended or adjusted under 35 U.S.C. 154(b) by 17 days.

(21) Appl. No.: 16/731,882

(22) Filed: Dec. 31, 2019

(65) Prior Publication Data

US 2021/0203521 A1 Jul. 1, 2021

(51) Int. Cl.
*H04L 12/28* (2006.01)
*H04L 67/025* (2022.01)
(Continued)

(52) U.S. Cl.
CPC ...... *H04L 12/2809* (2013.01); *H04L 12/2834* (2013.01); *H04L 67/025* (2013.01);
(Continued)

(58) Field of Classification Search
CPC ............ H04L 12/2809; H04L 12/2834; H04L 67/025; H04L 67/1025; H04L 67/16;
(Continued)

(56) References Cited

U.S. PATENT DOCUMENTS 7,343,459 B2 * 3/2008 Prahlad .............. G06Q 30/0283
707/999.204
8,064,499 B2 * 11/2011 Stafford ............. H04B 1/70752
375/E1.016

(Continued)

FOREIGN PATENT DOCUMENTS

EP 2412820 A1 * 2/2012 ........... C12Q 1/6886
EP 2541523 A1 * 1/2013 ............. G08G 1/052
(Continued)

OTHER PUBLICATIONS

Design and Evaluation of a Telemonitoring Concept Based on NFC-Enabled Mobile Phones and Sensor Devices Jürgen Morak;Hannes Kumpusch;Dieter Hayn;Robert Modre-Osprian;Günter Schreier Year: 2012 | vol. 16, Issue: 1 | Journal Article | Publisher: IEEE (Year: 2012).*

(Continued)

*Primary Examiner* — Ninos Donabed
(74) *Attorney, Agent, or Firm* — Patent Capital Group

(57) ABSTRACT

There is disclosed in one example a computing apparatus, including: a hardware platform including a processor and a memory; a network interface to communicatively couple to a network; and a network gateway engine to identify devices on the network, the network gateway engine including instructions encoded within the memory to instruct the processor to provide two-phase identification for a device newly-identified on the network, including: a static identification phase including applying discovery probes to the newly-identified device; and a dynamic identification phase including collecting network telemetry for the newly-identified device over time and analyzing the collected network telemetry to determine if the network telemetry is consistent with expected network usage for the newly-discovered device.

17 Claims, 11 Drawing Sheets

(51) Int. Cl.
  *H04L 67/1025* (2022.01)
  *H04L 67/51* (2022.01)
(52) U.S. Cl.
  CPC .......... *H04L 67/1025* (2013.01); *H04L 67/51* (2022.05); *H04L 2012/2841* (2013.01)
(58) Field of Classification Search
  CPC ........... H04L 2012/2841; H04L 43/065; H04L 41/0213; H04L 41/0853; H04L 12/2803; H04L 67/01; H04L 67/12; H04L 69/329; H04L 67/10; H04L 67/51; H04L 67/02; G06F 2201/86; G06F 11/0709; G06F 11/34; G06F 11/3466; G06F 21/552; G06F 21/50; G06F 21/30; G06F 21/44; G06F 21/566
  USPC ........................................................ 709/224
  See application file for complete search history.

(56) References Cited

U.S. PATENT DOCUMENTS

| | | | | |
|---|---|---|---|---|
| 8,874,477 | B2* | 10/2014 | Hoffberg | G06Q 20/065 |
| | | | | 705/37 |
| 9,558,017 | B2* | 1/2017 | Plate | G06F 21/577 |
| 11,283,865 | B2* | 3/2022 | Madisetti | H04L 9/50 |
| 11,658,867 | B1* | 5/2023 | Kushwaha | H04L 41/0894 |
| | | | | 709/224 |
| 2002/0091991 | A1* | 7/2002 | Castro | G06F 9/06 |
| | | | | 717/106 |
| 2005/0097610 | A1* | 5/2005 | Pedlow | H04N 7/16 |
| | | | | 725/111 |
| 2006/0053263 | A1* | 3/2006 | Prahlad | G06N 5/04 |
| | | | | 711/161 |
| 2007/0087756 | A1* | 4/2007 | Hoffberg | G06Q 10/06375 |
| | | | | 455/450 |
| 2008/0117955 | A1* | 5/2008 | Stafford | H04B 1/70752 |
| | | | | 375/E1.008 |
| 2008/0140160 | A1* | 6/2008 | Goetz | G16H 40/67 |
| | | | | 607/60 |
| 2008/0313486 | A1* | 12/2008 | Parfitt | G05B 19/054 |
| | | | | 713/600 |
| 2009/0049207 | A1* | 2/2009 | Reynolds | H04L 67/51 |
| | | | | 710/16 |
| 2009/0188893 | A1* | 7/2009 | Titus | H01H 9/041 |
| | | | | 218/149 |
| 2015/0268948 | A1* | 9/2015 | Plate | G06F 21/577 |
| | | | | 717/123 |
| 2017/0034023 | A1* | 2/2017 | Nickolov | H04L 43/0817 |
| 2017/0063912 | A1* | 3/2017 | Muddu | G06V 10/225 |
| 2017/0216611 | A1* | 8/2017 | Yoder | A61N 1/37217 |
| 2018/0189046 | A1* | 7/2018 | Kunisetty | H04L 41/082 |
| 2018/0234326 | A1* | 8/2018 | Swierk | H04L 69/08 |
| 2018/0241781 | A1* | 8/2018 | Vasters | H04W 12/126 |
| 2019/0296979 | A1* | 9/2019 | Gupta | G06N 3/08 |
| 2020/0136937 | A1* | 4/2020 | Savalle | H04W 4/70 |
| 2020/0162346 | A1* | 5/2020 | Diaz-Cuellar | G06F 21/10 |
| 2020/0344203 | A1* | 10/2020 | Mermoud | H04L 67/12 |
| 2021/0120010 | A1* | 4/2021 | Chen | H04L 63/108 |

FOREIGN PATENT DOCUMENTS

| | | | | |
|---|---|---|---|---|
| WO | WO-2017131999 A1 * | 8/2017 | ......... | A61N 1/37276 |
| WO | WO-2021080554 A1 * | 4/2021 | ........... | G06F 21/552 |

OTHER PUBLICATIONS

Satellite Micro Anomaly Detection Based on Telemetry Data Chao Sun;Shaojun Chen;Mingzhang E;Ying Du;Chuanmin Ruan 2020 IEEE 9th Data Driven Control and Learning Systems Conference (DDCLS) (Year: 2020).*

Cost Effective Troubleshooting of NFV Infrastructure Ran Basat;Gil Einziger;Maayan Goldstein;Liat Pele;Itai Segall. 2020 IFIP Networking Conference (Networking) (Year: 2020).*

A Two-Stage Process Based on Data Mining and Optimization to Identify False Positives and False Negatives Generated by Intrusion Detection Systems Hachmi Fatma;Mohamed Limam 2015 (Year: 2015).*

Two-Stage Process Based on Data Mining and Optimization to Identify False Positives and False Negatives Generated by Intrusion Detection Systems Hachmi Fatma;Mohamed Limam 2015 (Year: 2015) (Year: 2015).*

Two-Stage Process Based on Data Mining and Optimization to Identify False Positives and False Negatives Generated by Intrusion Detection SystemsHachmi Fatma;Mohamed Limam 2015 (Year: 2015) (Year: 2015) (Year: 2015).*

* cited by examiner

DEVICE IDENTIFICATION

FIELD OF THE SPECIFICATION

This application relates in general to network security, and more particularly, though not exclusively, to a system and method for device identification on a network.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
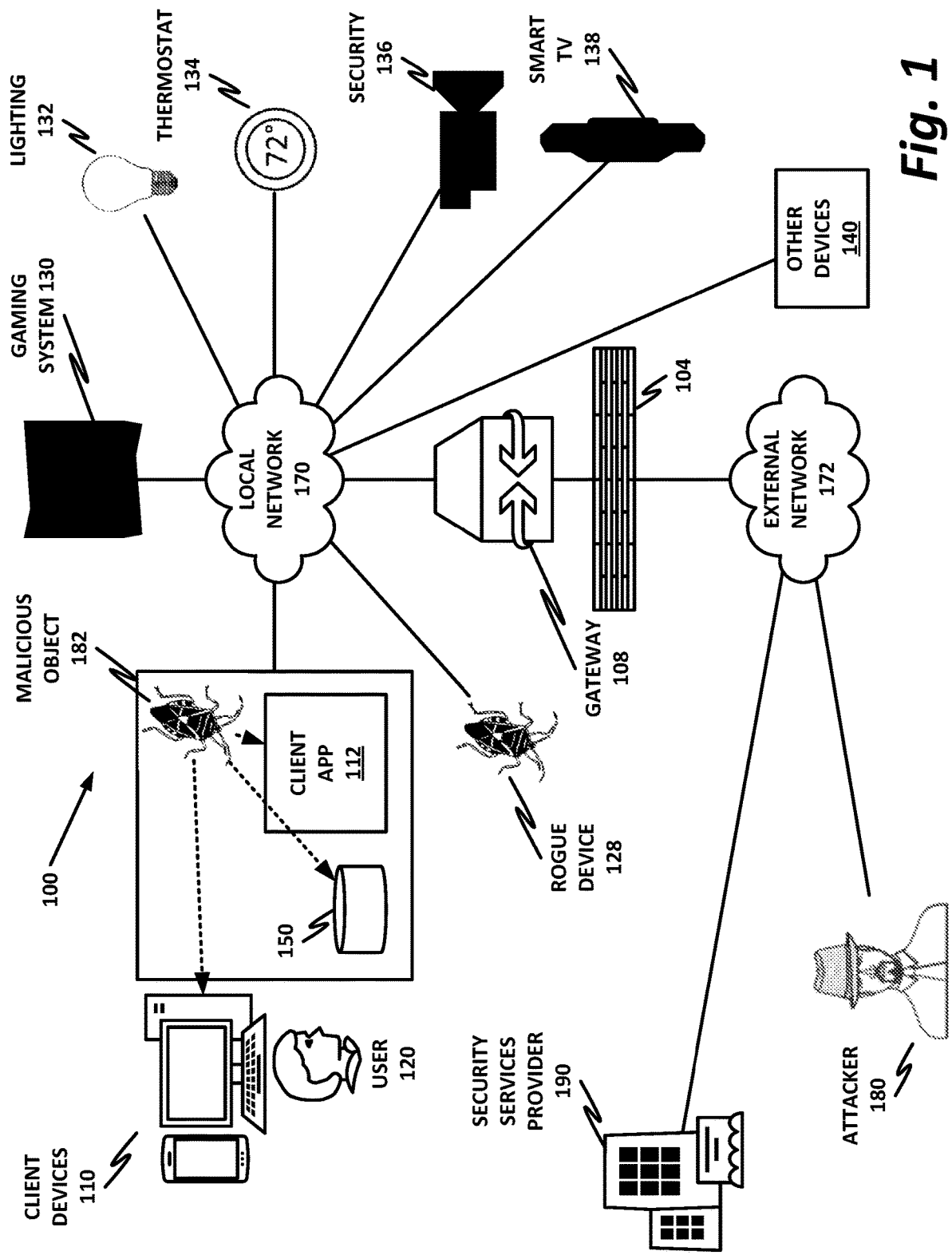
FIG. 1 is a block diagram of selected elements of a security ecosystem.

In an example, there is disclosed a computing apparatus, comprising: a hardware platform comprising a processor and a memory; a network interface to communicatively couple to a network; and a network gateway engine to identify devices on the network, the network gateway engine comprising instructions encoded within the memory to instruct the processor to provide two-phase identification for a device newly-identified on the network, comprising: a static identification phase comprising applying discovery probes to the newly-identified device; and a dynamic identification phase comprising collecting network telemetry for the newly-identified device over time and analyzing the collected network telemetry to determine if the network telemetry is consistent with expected network usage for the newly-discovered device.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The present specification describes illustrative systems and methods for identifying devices on a network. Throughout this specification, the network will be referred to as a "home network," and the device that services the home network will be referred to as a "home gateway." This terminology is used to illustrate one advantageous option for employing the teachings and methods of the present specification. However, these examples should not be understood to be limiting or exclusive. Throughout this specification, when the term "home network" is used, it should be understood to encompass any network in which the teachings of the present specification may be employed. Similarly, the term "home gateway" should be understood to encompass any gateway, router, firewall, network appliance, switch (including an enterprise switch), or any other similar device that may be used to service such a network. It is expressly intended that the term "home network" stand as an example of any suitable network including, by way of illustrative and nonlimiting example, an enterprise network, a business intelligence network, a government network, a data center network, or similar. A home gateway should be understood to encompass any of the various network devices and apparatuses that service such a network.

Similarly, the teachings of the present specification are useful in the internet of things (IoT) context. The IoT is simply a catchall term that broadly describes networks in which a large number of various devices are attached. In common usage, the IoT is used particularly to refer to "smart devices," which may be deployed in large numbers on a network. For example, in addition to more traditional "headful" devices (e.g., desktop computers, laptop computers, tablets, smart phones, and similar interactive user devices), this may include so-called "headless" devices that are less user interactive. Headless devices could include, by way of illustrative and nonlimiting example, smart refrigerators, smart lightbulbs, smart locks, smart power systems, network-connected security cameras, smart televisions, gaming systems, and other similar devices. There is no hard and fast boundary between headful devices and headless devices, but characteristically, a headless device has a much more limited user interface, and the interface generally exposes a relatively limited number of functions. A headful device, in contrast, is a general-purpose device that exposes a more flexible interface such as a graphical user interface (GUI), desktop, command-line interface (CLI), or similar.

Because of the ever-increasing proliferation of devices, device identification becomes an important consideration in the IoT context. This may be important in the first case, because a user administering a home network may need to be able to see, such as via a web-based GUI (often accessible at the home gateway's internet protocol, or IP, address) which devices are connected to the network, and may need to perform some basic administrative tasks. Because users of home gateways are often not computer networking and security experts, it is advantageous to expose to these users an interface that makes network management easier. For example, MCAFEE, LLC provides Secure Home Platform (SHP), a network-based GUI that provides security to a home network, and that provides a network-based GUI that the user can use to administer the network. SHP and similar products may include a home gateway engine, including a device identification module, as described in the present specification.

Device identification may be required in the home network to display the types of devices attached to the network, and to allow the home administrator to manage the network. Furthermore, device identification may be used by home network devices such as a home gateway (e.g., SHP or similar) to enforce security and privacy policies.

In one example, the home gateway may use device identification services to collect network traffic telemetry only for devices classified as "headless IoT devices," for anomaly detection.

Traffic flow telemetry, transport layer security (TLS) handshake data features, and domains visited by devices may be exported by the home gateway, and a home gateway filter cloud service may provide cloud analytics for both headful and headless devices. Furthermore, in some embodiments, a home gateway may add IoT device-specific firewall rules.

A home gateway may also inspect traffic exchanged with headless IoT devices, for example, using fast path inspection (FPI) or a similar framework.

In some existing systems, device identification may be performed via the device media access control (MAC) address, device fingerprint probes like a multicast domain name server (mDNS), universal plug and play (UPnP) protocols, network traffic data like dynamic host configuration protocol (DHCP) parameter request list option 55, hypertext transfer protocol (HTTP) user agent header, and network traffic telemetry (e.g., domains visited and traffic pattern) to determine the device category. For example, the device may be categorized as headful, mobile, multimedia, home office, home automation, network device, or similar. Device identification may also be used to identify the make and model of the device.

However, a compromised device may lie, for example, and advertise a fabricated MAC address, fake the parameter request list option 55, advertise services not available on the device using mDNS or UPnP, and/or publish fake device identification in the HTTP user agent header.

For example, Chameleon is a new open source extension for Mozilla Firefox that is part of the Firefox add-on random agent spoofer for the browser. This allows a user to spoof the user agent for a browser, and to identify the device however the user wishes.

Furthermore, in some examples, device identification data features may not be available to fingerprint the device. For example, if the device is attached to a Wi-Fi extender in the home, the home gateway may not know the actual MAC address of the device. For example, a known TP-Link Wi-Fi extender replaces the MAC address for the attached device with a virtual MAC. Also, in some cases, the device fingerprint probes may not reveal enough information to identify the device.

Furthermore, network traffic telemetry may not be immediately available after the device attaches to the network. Rather, it may take a matter of hours or days to collect the required network traffic telemetry fingerprint to successfully identify the device.

In an internet protocol version 6 (IPv6) home network, DHCP is not mandatory. Thus, endpoints can use stateless address autoconfiguration (SLAAC), and DHCP messages cannot be used to identify the device.

If a device is misclassified, its traffic will no longer be inspected, and network traffic telemetry may not be collected for analytics. Thus, a compromised or misclassified device may successfully continue malicious activity on the network. Advantageously, the home gateway of the present specification includes a device identification module that provides more robust identification than some existing methods. This can help to ensure the device identification is correct, and therefore ensure that the proper security protocols are applied to devices, even if they are compromised, and/or if they misadvertise or spoof their identity.

Embodiments of the present specification provide a novel home gateway that detects devices with fake and incomplete fingerprint data, and accurately reclassifies those devices to enforce appropriate security and privacy policies.

In some embodiments, the home gateway of the present specification uses a framework that combines multiple device fingerprinting probes and network data to provide a more robust device identity. This can help to identify devices that may be faking or spoofing fingerprint data, which can in some examples be used to identify these devices as malicious.

A device identification system may use one or more active device fingerprint probes such as mDNS, UPnP, DHCP, and/or a user agent to attempt to uniquely identify a device. While it is relatively easy and fast to gather these probes, as described above, they are prone to spoofing. Furthermore, these probes are in some cases vague, and may make the identification less reliable. Some research has indicated that using network data for device identification is more reliable. Because network and traffic data are relatively difficult to spoof consistently without adversely affecting the actual desired functionality of a device (especially an IoT device), an identification method that accounts for network data and telemetry may be more robust than one that relies exclusively on fingerprint data.

Network data are, however, less practical for real-time identification, because it takes longer (e.g., a matter of hours or days) to collect reliable network traffic data. Thus, one principle of the device identification module of the present specification is to correlate real-time fingerprinting data with network data collected over time, and to determine if there is a mismatch between the two. If a device is not infected or compromised, then the device identification based on active probe fingerprinting and network traffic data should be consistent. On the other hand, if the device is compromised, there may be a mismatch.

The home gateway engine of the present specification includes a device identification module that combines active probe fingerprinting and network data to detect devices with fake or incomplete fingerprint probes. The framework described herein accurately reclassifies devices using network traffic telemetry data. This classification or reclassification may occur over time, after an initial fingerprinting-based identification. In cases where identification is not consistent between the active probes and the network data, the home gateway may flag these devices and apply a filtering list to find potentially anomalous devices.

This system uses fingerprint probes and network behavior not only to uniquely identify the devices, but also to determine if a device is lying about its identity. Furthermore, the system may collect and analyze network behavior at random intervals to ensure that the behavior remains consistent over time. This can help detect sophisticated malware attacks that might remain dormant for certain periods of time.

In an experimental application of the home gateway of the present specification, the home gateway examined a network with 29 devices. The home gateway successfully identified 93% of the devices on the network.

In an illustrative embodiment of the present specification, the home gateway or router is the gateway for all IP communications in a connected home. This makes the home gateway a vantage point for implementing probes required for identifying individual devices.

In an illustrative method, identification probes use two major techniques:

Active Probing—characterized by industry-standard protocols such as UPnP and mDNS for device and service discovery. These give hints about the type of device subject to identification. For example, multimedia streaming devices such as Roku, Amazon Fire TV sticks, and others advertise themselves using UPnP and publish device details, including model numbers.

Passive Monitoring—in an illustrative home network, all devices connect to the home gateway or router to access the internet and to perform their intended tasks. By monitoring their network characteristics and behavior (e.g., DHCP options, DNS messages, and network traffic data characteristics), the device type and/or make of the device may be identified.

One purpose of device identification is to predict a device identity. This may be represented, in an illustrative example, by a tuple consisting of {type, manufacturer, model}. This tuple for the device may be based on one or more given inputs, such as device fingerprint probes (e.g., mDNS, UPnP, or similar), network traffic data (e.g., HTTP user agent, DHCP parameter request list option 55), and network telemetry data (e.g., domains visited and traffic patterns). The device identification methods may be at a higher level, categorized into two general types: one, rule-based identification, and two, machine learning (ML)-based identification.

For example, device fingerprinting probes and network traffic data often provide rich data that may be used for device identification. In this case, it is possible to manually identify patterns, such as textual and/or alphanumeric patterns, and convert them into rules for a rule-based identification. In one illustrative example, the UPnP fingerprint of a device contains a pattern "xxxx." This pattern identifies the device as being of a particular type.

One advantage of rule-based identification is that, given a reliable pattern, the identification is consistently accurate, provided the fingerprint is not fake. There are, however, challenges with rule-based approaches.

For example, it is extremely difficult to scale the rule-based identification to all types of devices available. Such scaling would essentially require a database of every conceivable make and model of every possible device.

Rules also need to be manually updated whenever the format of fingerprinting probes changes.

In some cases, rule-based identification may be used to help create labeled data for ML-based identification. For example, a rule-based engine may be used to create labeled data, and to train ML models on it.

As discussed above, one challenge with fingerprinting-based identification is that a device may simply lie. Thus, there are certain limitations to fingerprinting probes, such as mDNS, UPnP, or HTTP user agent. For example, these are relatively easy to spoof, and in some cases they are vague or less informative. In such cases, both rule-based and ML identification may either fail, or provide less confident identification. Even in cases where multiple data types (e.g., finger printing probes, network traffic, and telemetry) are used together (known as ensemble learning, or feature-fusion based learning) to identify a device, the spoofing in fingerprinting probes will introduce noise and lead to unreliable predictions.

Much of the progress in refining device identification has failed to address the issue of devices that may be lying about their identity. Advantageously, the device identification module of the present specification combines multiple device fingerprinting probes with device telemetry data to accurately identify devices, and to identify devices that may be lying through one or more device fingerprinting probes. One assumption of this method is that network telemetry data is difficult to consistently spoof. Presumably, if a device has been compromised with malware, it is because the malware author has some intended goal, and wants the device to accomplish some work. Eventually, this "work" performed on behalf of the malware author will show up as network traffic that is inconsistent with the alleged identity of the device that is misidentifying itself. Thus, the network telemetry data can be used to reclassify devices where fingerprinting probes provide inconsistent device identification. Another advantage of using network and traffic telemetry data is that it is available for all smart devices and IoTs, even if they do not provide reliable or detailed individual identification data via fingerprinting probes.

While network traffic and telemetry data are more reliable and can provide more accurate device identification, it takes time to process these data. Thus, it is difficult or impractical to use network telemetry data in real-time device identification. For example, in the case of DNS data, it may be necessary to monitor DNS traffic for at least 24 hours so that DNS time-to-live (TTL) requests timeout. Only after this 24-hour period can reliable predictions be made based on DNS traffic.

As discussed above, in some cases there is inconsistent identification among different data sets. For example, the Amazon Echo class of devices are seen to include "kindle front/2.0" in their user agent. A typical user agent parser may identify an Amazon Echo as a Kindle e-reader. However, other fingerprinting probes (e.g., mDNS in the case of Amazon Echo Show) will identify the device as a voice assistant. Both identifications may be appropriate in certain contexts, but after monitoring the network data for several hours, a home gateway may be able to conclude that the device is, in fact, a voice assistant and not a Kindle e-reader.

If fingerprint probes identify devices with low confidence, or the device identification results are inconsistent, adaptive deep packet inspection (DPI) may be used to collect network traffic data for a device when its identity is in doubt. Adaptive DPI includes conditionally enabling DPI for specific devices or flows on home routers.

A system and method for device identification will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In at least some embodiments, security ecosystem 100 may be configured or adapted to provide device identification, according to the teachings of the present specification.

In the example of FIG. 1, security ecosystem 100 may be an enterprise, a government entity, a data center, a telecommunications provider, a "smart home" with computers, smart phones, and various IoT devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as DHCP, gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control gaming system 130, lighting 132, thermostats or other environmental controls 134, a security system 136, smart TV 138, and any number of other devices 140. Other devices 140 may include, as illustrative and nonlimiting examples, network attached storage (NAS), computers, printers, smart televisions, smart refrigerators, smart vacuum cleaners and other appliances, and network-connected vehicles.

Gaming system 130 could be, for example, an Xbox, a PlayStation, a Nintendo system, or some other gaming system with network capabilities.

Smart TV 138 could be a Roku TV, Apple TV, Samsung TV, or some other smart television. Smart TV 138 could also encompass a television with an attached media server or multimedia device such as a Roku, a Plex server, an Apple TV streaming server, a streaming computer, a gaming system with streaming enabled, or some other similar device.

There is also illustrated in FIG. 1 a rogue device 128. Rogue device 128 is illustrated as a device that sits on local network 170 (e.g., a home network) and that may be compromised, or that may be configured ab initio with malicious intent. For example, attacker 180 could inject malicious object 182 into client device 110, and thereby cause client device 110 to compromise rogue device 128. Thus, rogue device 128 could start out as a legitimate device, such as a legitimate IoT device, but once compromised may perform malicious activity such as acting as a botnet server, providing a backdoor for an attacker, or performing some other malicious activity.

In other embodiments, rogue device 128 could be a device that the user installs and that does things other than what it claims to do. In that case, it need not be compromised to perform malicious activity, but rather may be configured from the beginning with malicious intent. In that case, the attack may simply consist of convincing user 120 to install rogue device 128 onto the network.

One property of rogue device 128 may be that it provides inconsistent or falsified data when queried. For example, mDNS and UPnP queries may yield results in an initial fingerprinting profile that identify rogue device 128 as a device such as, for example, a traditional streaming media server, a smart lightbulb, a smart refrigerator, or some other benign device. However, either because it has been configured maliciously from the start, or because the device has been compromised, the device actually will do some malicious work on behalf of attacker 180.

Because malicious device 128 provides deceptive data during an initial fingerprinting stage, gateway 108 (e.g., a home gateway such as SHP provided by MCAFEE, LLC) may not initially successfully identify rogue device 128 using traditional fingerprinting methods.

However, gateway 108 may continue to monitor traffic from rogue device 128 as it continues to function. For rogue device 128 to perform useful work on behalf of attacker 180, it will eventually need to initiate network activity that will be inconsistent with the initial deceptive information it provided to gateway 108. In some cases, rogue device 128 may even include malware that sits dormant for a time to try to deceive gateway 108 into believing it is a benign device. After lying dormant for a time, rogue device 128 may finally start performing its intended function by, for example, sending data to attacker 180 that provides a backdoor into the network, provides personal information for user 120, or otherwise compromises the safety, security, or privacy of the network.

Therefore, it is advantageous for gateway 108 to include useful logic such as a device identity module that performs not only the initial fingerprinting of devices on the network, but that also continues to monitor devices to ensure that their network activity remains consistent over time with that initial profile. If there is an anomaly in the network behavior, such as rogue device 128 beginning to send personal data to attacker 180, gateway 108 may notify user 120, or may take some other remedial action such as isolating rogue device 128, blocking traffic to a suspicious IP address (e.g., an IP address for attacker 180), notifying a system administrator, notifying a security actor, notifying a cloud service such as security service provider 190, or performing some other remedial action or any combination thereof.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
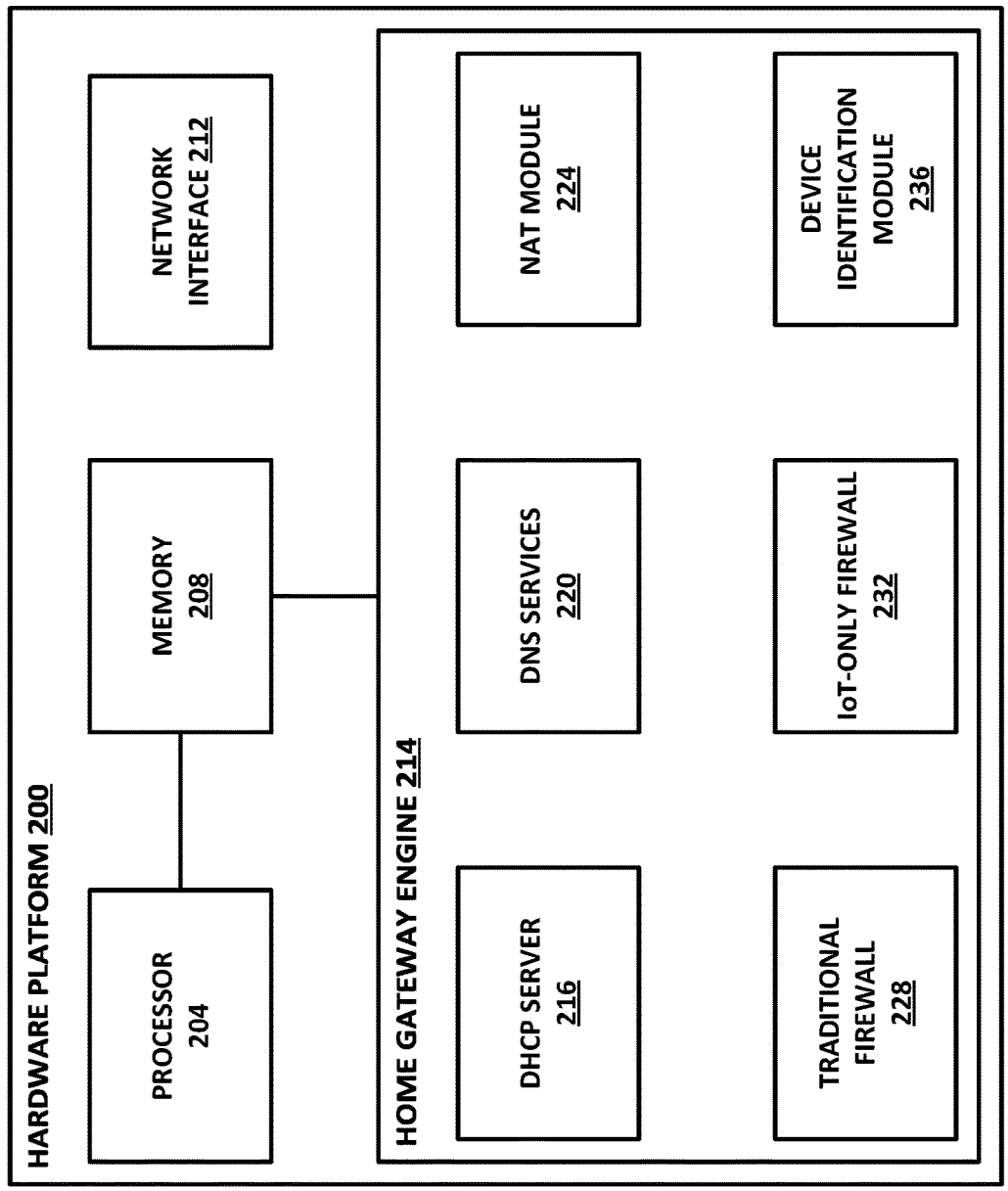
FIG. 2 is a block diagram of an illustrative hardware platform.

FIG. 2 is a block diagram of an illustrative hardware platform 200. In this example, hardware platform 200 includes a processor 204 and a memory 208. Hardware platform 200 also includes a network interface 212.

Hardware platform 200 may be a hardware platform that is configured to provide, for example, a home gateway via home gateway engine 214. For example, at execution time, processor 204 may load instructions from a storage into memory 208 and execute them to provide home gateway engine 214. Note that in this example, memory 208 may include both volatile and nonvolatile memory, which are illustrated as a unitary block in FIG. 2 for convenience. In an actual embodiment, volatile and nonvolatile memory may be unified or separate, according to specific design considerations.

Home gateway engine 214 includes various blocks, such as a DHCP server 216, DNS services 220, network address translation (NAT) module 224, traditional firewall 228, IoT-only firewall 232, and device identification module 236.

DHCP server 216 traditionally listens on port 68 for DHCP requests. These are requests by endpoint devices for a local address, such as an internet protocol version 4 (IPv4) address, as well as DNS servers, a default gateway, and other data provided by home gateway engine 214. This enables the DHCP client devices to communicate on the network.

DNS services 220 may listen for DNS requests, for example, on port 53. In one embodiment, home gateway engine 214 may provide a caching DNS server that provides local DNS services. In some cases, this may be backed up by a remote DNS server that provides a more comprehensive database.

NAT module 224 provides network address translation services to endpoint devices. This translates traffic between the external network and the internal network. For example, NAT module 224 may assign a particular port to transactions for a specific endpoint. When NAT module 224 receives a packet directed to that port, it translates this into a local Ethernet address on the local network, and appropriately forwards the traffic. Traditional firewall 228 provides ordinary firewall services, such as opening and closing specific ports, allowing or blocking specific host names or IP addresses according to a blacklist or a white list, port forwarding, and other firewall services.

IoT-only firewall 232 is a relatively recent innovation, in which specific firewall rules may be configured for IoT devices. This may include provisioning firewall rules for IoT devices as a class, or provisioning specific firewalls for individual hosts that have been identified as IoT devices. Indeed, a device need not necessarily be identified as an IoT device for special firewall rules to be provisioned for that host. However, it is common to use this service for IoT devices.

Home gateway engine 214 also includes a device identification module 236. Device identification module 236 provides various device identification services, including services according to the teachings of the present specification. For example, device identification module 236 may provide traditional fingerprinting-based device identification, in addition to more extensive profiling that may be performed after an initial device identification.

In some embodiments, this device identification may be referred to as a two-tier device identification. The first tier of device identification is referred to as static identification (SI). SI is performed, for example, using traditional discovery probes, and usually takes on the order of two to five minutes. Device identification module 236 may also provide a dynamic identification (DI) tier using, for example, network usage patterns. The DI tier may take longer, such as on the order of hours, days, or even weeks. Furthermore, the DI tier of device identification module 236 may be configured to execute periodically even after a device has been identified with high confidence. Thus, if a device is compromised later, or if it has a malware agent that stalls to prevent detection and identification, this can be detected later as periodic scans occur.

Figure 3:
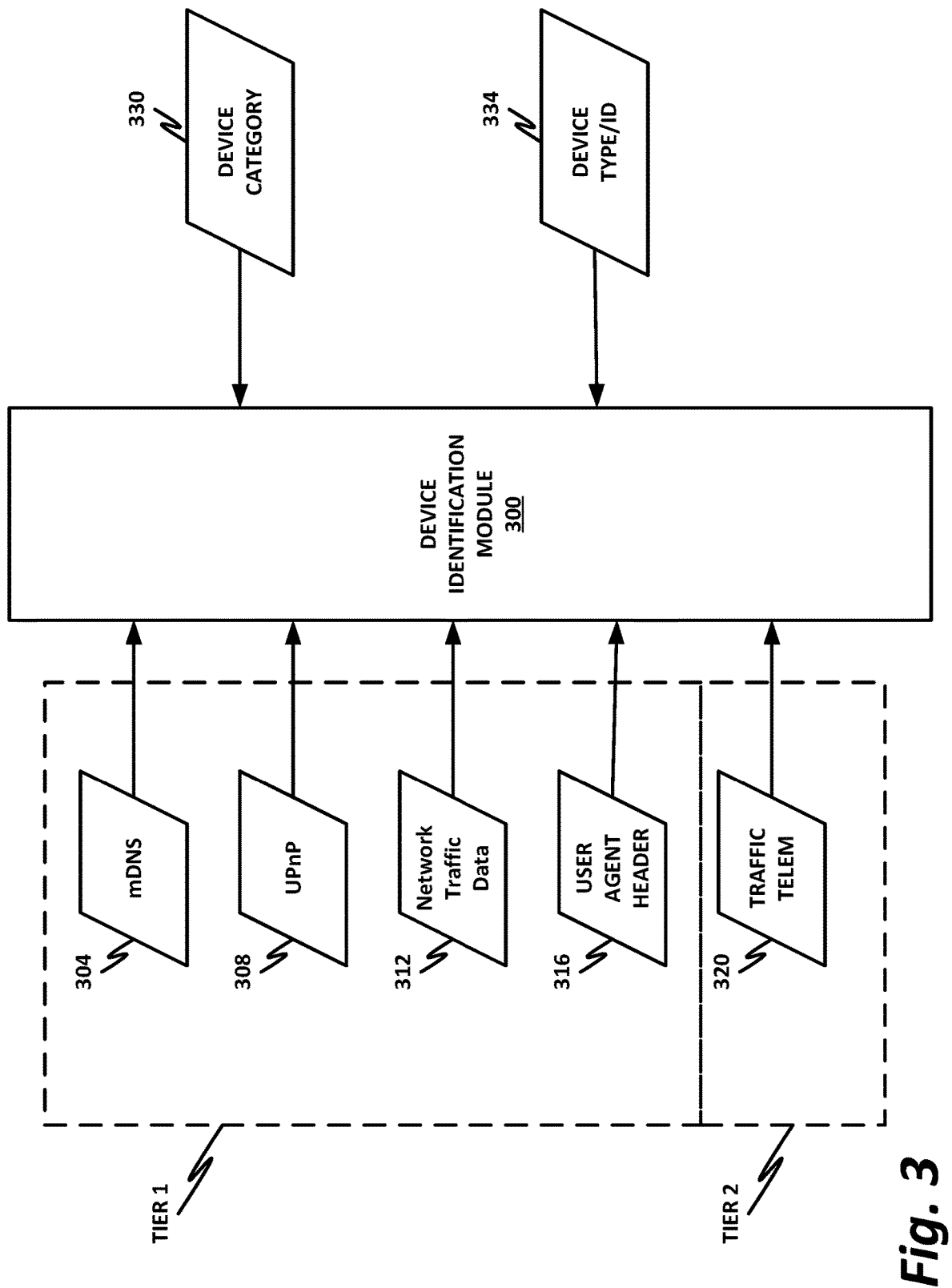
FIG. 3 is a block diagram illustrating device discovery using a device identification module.

FIG. 3 is a block diagram illustrating device discovery using a device identification module 300. In this case, device identification module 300 receives a number of inputs. These may include, for example, mDNS data 304, UPnP data 308, network traffic data 312, user agent headers 316, and traffic telemetry 320.

In this illustration, mDNS data 304, UPnP data 308, network traffic data 312, and user agent header 316 may be considered tier 1 (or SI) device identification data. Traffic telemetry 320 may be considered tier 2 (or DI) device identification data.

Using these data, device identification module 300 provides a device category 330, as well as a device type or ID 334. Device type or ID 334 may include, for example, a make and model of the device, or even a unique identifier for the device if several makes and models are found. For example, if device identification module 300 identifies six Philips smart lightbulbs on the network, a user may be able to use an interface such as a GUI to assign a specific identity to each Philips lightbulb (e.g., living room lightbulb, master bedroom lightbulb, boys' bedroom lightbulb, girls' bedroom lightbulb, game room lightbulb, and main bathroom lightbulb).

The tier 1 identification of a Philips lightbulb may be based on the tier 1 or SI data provided, namely in blocks 304, 308, 312, and 316. Over time, device identification module 300 may collect traffic telemetry 320, which acts as tier 2 or DI data.

In some cases, the tier 1 data may not all agree. In that case, there are methods for reconciling the tier 1 data and finding a best result. Over time, the tier 2 data may either match the reconciled tier 1 data, or there may be a mismatch. In the case of a mismatch, there are additional methods to reconcile the data.

For example, the smart Philips lightbulb identified as "game room lightbulb" may have been compromised by a virus. In addition to turning on and off, and optionally acting as a Bluetooth speaker, the lightbulb may provide a backdoor into the network for an attacker, may "sniff" data from the network not intended for the lightbulb, and may send data back to a malicious actor.

The tier 1 identification of the game room lightbulb may identify the device with high confidence as a Philips smart lightbulb with a Bluetooth speaker feature. However, in the tier 2 identification, device identification module 300 may monitor network traffic telemetry from the game room lightbulb, and notice that it is communicating with network addresses that should not be accessed by a smart lightbulb. In this case, the home gateway may conclude that the lightbulb may have been compromised, and may take appropriate remedial action.

Figure 4:
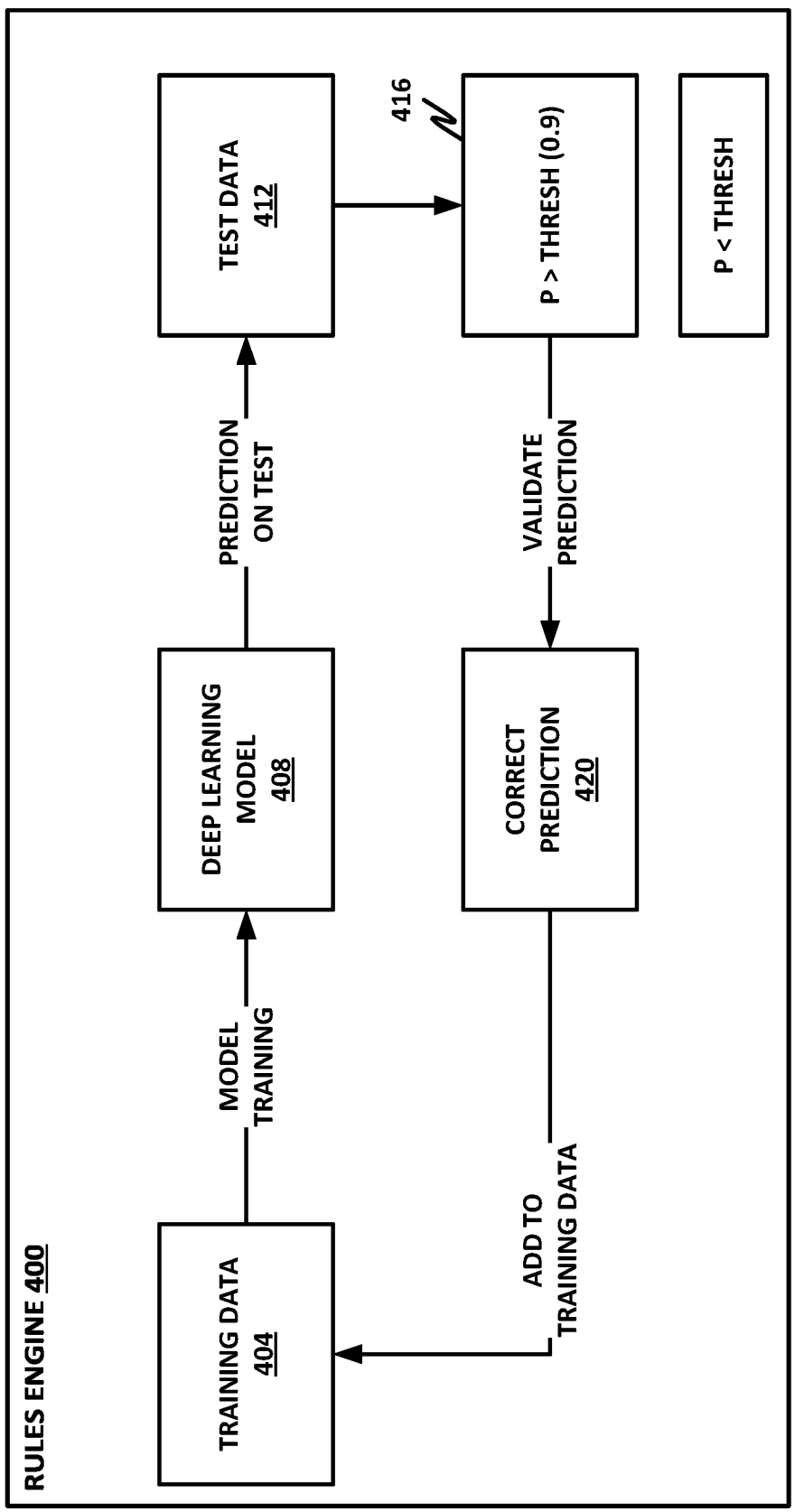
FIG. 4 is a block diagram illustrating a rules engine.

FIG. 4 is a block diagram illustrating a rules engine 400. Rules engine 400 may be part of a tier 1 identification engine of a device identification module such as device identification module 300 of FIG. 3.

Rules engine 400 provides device fingerprinting probes. Device fingerprinting probes and network traffic data often provide rich data that can be used for device identification. In this case, it is possible to manually identify patterns (e.g., textual and/or alphanumeric patterns), and convert them into rules for rule-based identification.

For example, if the UPnP fingerprint of a device contains pattern "xxxx," it may be identified as belonging to a particular category of device. One advantage of rule-based identification is that given a reliable pattern, the identification is always accurate, provided the fingerprint is not fake.

However, as discussed above, there are challenges with the rule-based approach. It is difficult to scale the rule-based identification to new devices, and when new devices are added, rules need to be manually updated.

Rules engine 400 provides not only a traditional rule-based engine that may be based on pattern matching, but also uses an ML model.

In this example, training data 404 are used for model training of deep learning model 408. Deep learning model 408 provides a prediction on a test to yield test data 412.

If the prediction on test data 412 has a confidence above a given threshold 416 (e.g., 0.9 or 90%), then the prediction is valid. On the other hand, if the prediction is beneath threshold 416, it is not valid.

If a valid prediction is made, then in block 420, the system may check whether the prediction is correct. If it is correct, then the prediction can be added to training data 404.

ML-based identification may be a classification model where the model is trained given a set of inputs. The inputs of training data 404 may include, for example, fingerprinting probes, network traffic, and telemetry. These are correlated to a particular type of target output (e.g., device type, manufacturer, and/or model). Rule-based identification on fingerprinting probes may be used to prepare input/output pairs (e.g., training data for block 404) to build an ML model.

For example, given the paired data {mDNS, device type}, the identification problem may be modeled as a text classification that uses the mDNS description as an input to predict a device type. Each fingerprint probe may be used to build a predictive model for device identification.

One or more fingerprinting probes may also be used to identify a device, using a set of features derived from both the device fingerprinting and network traffic data. Thus, in some examples, rules engine 400 may integrate both tier 1 static data tier 2 dynamic data.

The robustness of the identification may depend, in some cases, on the availability of training data and the choice of classification model.

Figure 5:
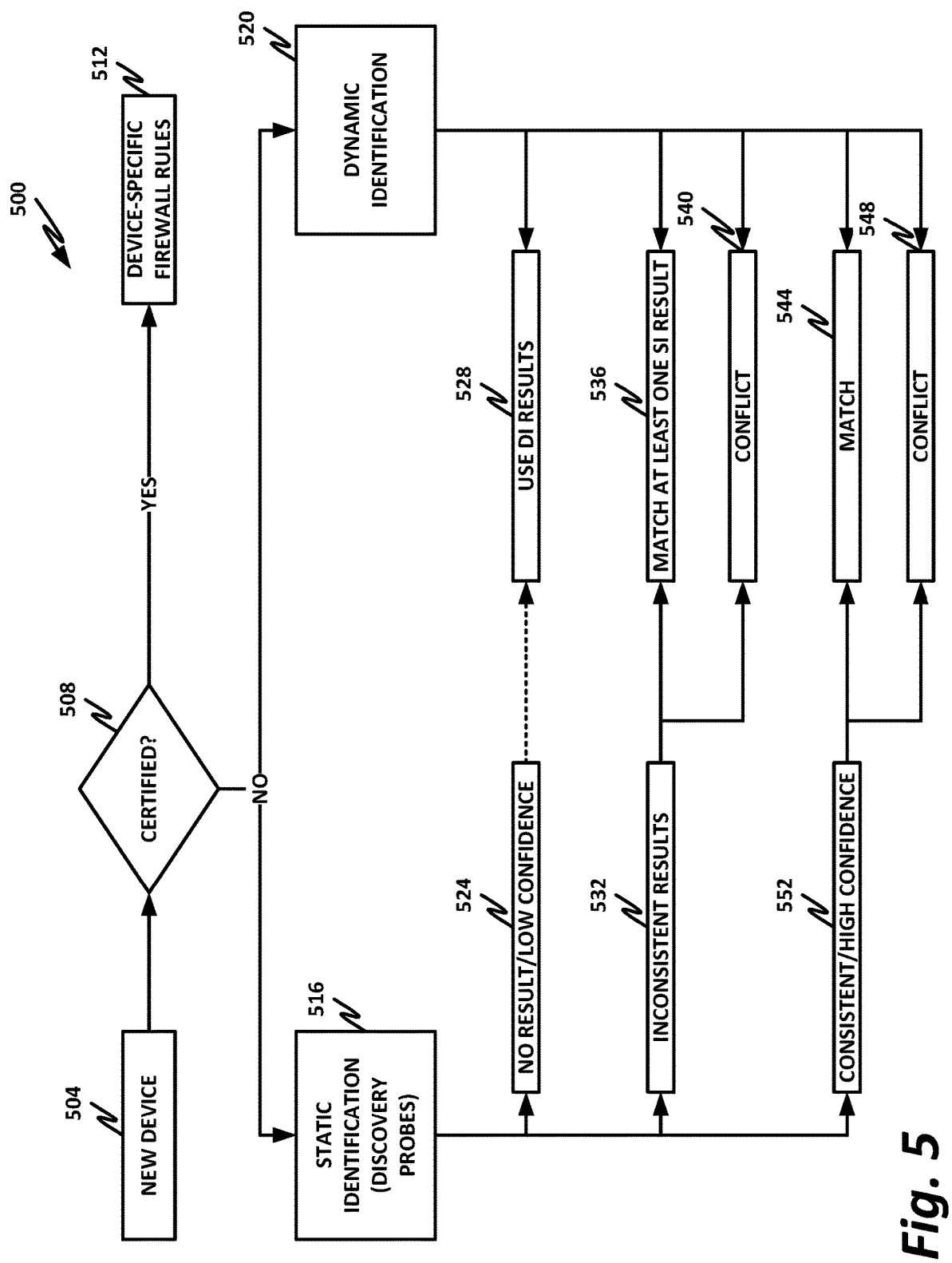
FIG. 5 is a block diagram of an identification ecosystem.

FIG. 5 is a block diagram of an identification ecosystem 500. In this example, a new device 504 connects to the network and requires identification and authentication.

The system may first determine whether new device 504 has a certified agent, or uses the connection protocol Wi-Fi Easy Connect.

For example, if the device is agentful, it includes a certified agent that certifies that the device has at least a minimum standard security protocol, and that the device is what it claims to be. For example, MCAFEE, LLC provides certified security agents that can be installed on devices to provide this kind of identification. Such agents are more common on headful devices, such as desktop or laptop computers, smart phones, and tablets.

Another option is that the device may use the relatively newer Wi-Fi Easy Connect protocol. The Wi-Fi Easy Connect protocol provides enhanced security, because it requires each device to have its own authentication tokens. Thus, it is difficult for a rogue device to spoof the MAC address of a known device that is authorized on the network, because it will not have the required authentication tokens, and communication between the authorized device and the gateway is encrypted.

If the device has a certified agent installed, the agent can be trusted to give correct identification. On the other hand, if the device was provisioned using certificate-based onboarding mechanisms such as Wi-Fi Easy Connect, the identity embedded in the device certificate may be trusted.

In block 508, if the device is certified, such as by having a certified security agent or by using Wi-Fi Easy Connect, then in block 512, the gateway may provision device-specific firewall rules for that device. In this case, the device identity problem is essentially solved, and in at least some embodiments, the gateway need not take further action to authenticate the device.

In the more common case (at least in current practice), the device is not certified. In this case, the device identification module may need to provide a two-tier device identification. This includes SI in block 516 using discovery probes, and DI in block 520 using, for example, network traffic telemetry.

SI relies on standard discovery protocols such as UPnP or mDNS, as well as crafted probes such as HTTP requests and connection protocols such as device MAC address and DHCP message.

In some cases, the fingerprints are incomplete or spoofed, and the device identification may be inconsistent. In those cases, reclassification of the device may be needed based on other factors.

Because SI in block 516 is not always reliable, network traffic for the device may be collected at random intervals to reclassify the device. The network data may be collected at random intervals to make sure that a compromised device cannot evade detection, for example, by remaining dormant for a particular duration. DI based on network behavior is provided by DI module 520.

The way DI in block 520 is applied may partially depend on the identification results of SI 516.

For example, one possible result in block 524 is no identification result, or a low confidence result. This may arise if the discovery probes provide no, or incomplete, fingerprint data. In this case, DI 520 may provide some results. In that case, where there is no reliable result from the static probes in block 524, then the DI results may be used in block 528.

Another possibility is in block 532. In this case, there are inconsistent results from the static discovery probes. For example, there may be multiple reasons for inconsistency across probes, such as the MAC address of a network extender being used for all devices connected to it. This may lead to inconsistent identification using MAC, or any other discovery probe.

In the case where DI 520 provides results that match one or more SI results (block 536), the matched identification may be accepted. On the other hand, if the identification from DI doesn't match with any SI identification, this implies that there may be potential spoofing with the device (conflict in block 540). In this case, remedial action may be taken, such as isolating the device, performing DPI, and/or providing appropriate notifications.

Yet another possible result, in block 552, is that the SI probes provide consistent and high-confidence results. In block 544, if the results of the dynamic identification match the high-confidence results, then these results may be used. On the other hand, in block 548, if there is a conflict between the DI results and the SI results, the device may be infected and may be lying about its fingerprints. Again, in this case, device isolation, DPI, notification, or other remedial action may be appropriate.

Figure 6:
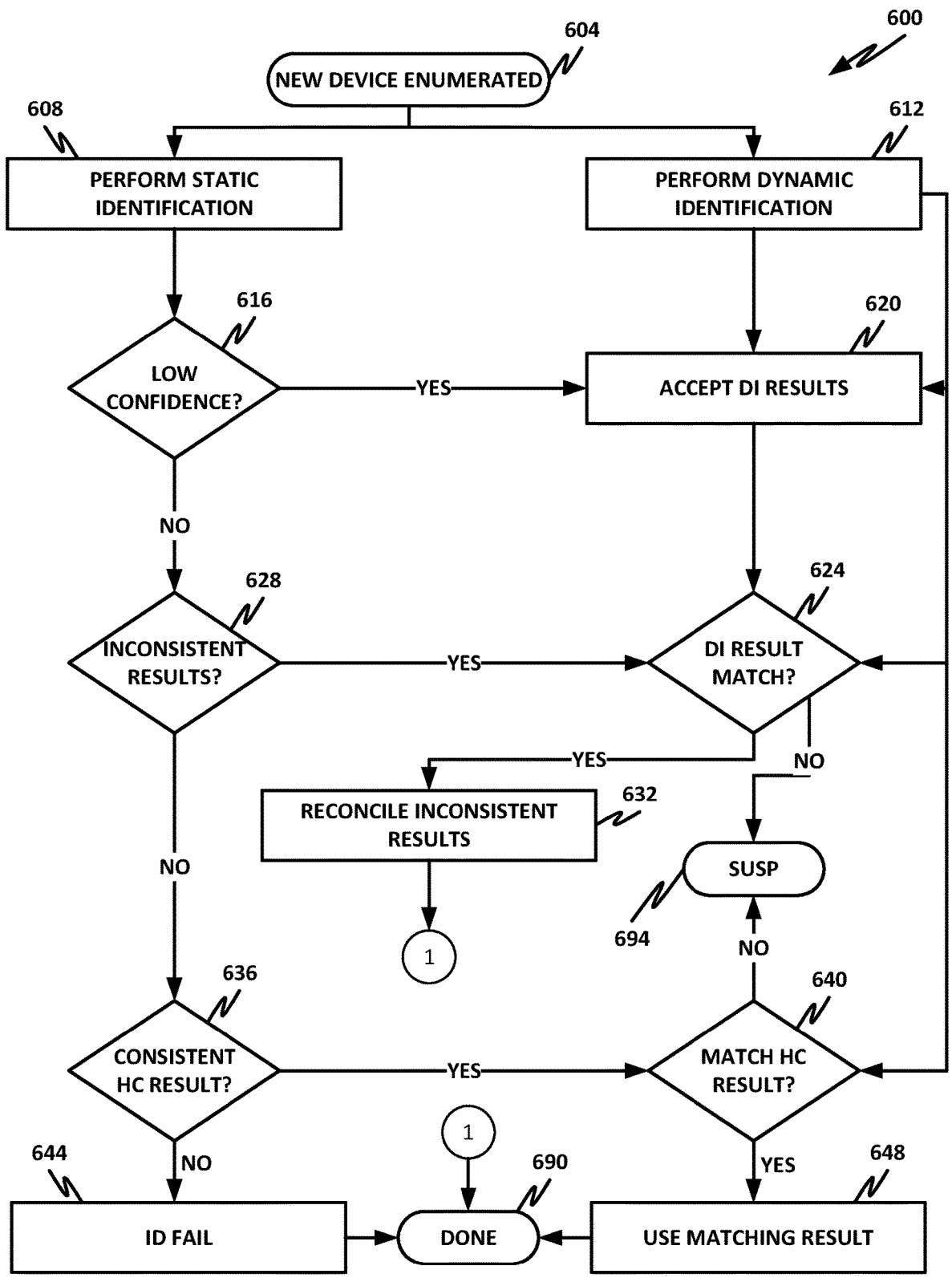
FIG. 6 is a flowchart illustrating a method implementing the identification ecosystem of FIG. 5.

FIG. 6 is a flowchart illustrating a method implementing identification ecosystem 500 of FIG. 5. Method 600 begins with block 604, where a new device is enumerated on the network.

In block 608, the gateway may perform SI according to the foregoing teachings of the present specification. Similarly, in block 612, the gateway performs DI consistent, for example, with the foregoing teachings. Note that DI may take place over a course of hours or days, as network traffic data are analyzed. Furthermore, DI may be an ongoing process that is provided at periodic intervals, or as a random audit to detect erroneous network identifications.

Flowing from block 608, in decision block 616, the gateway examines results to determine if this is a low confidence result.

For example, a low confidence result may be provided in the case of an incomplete fingerprint. This may occur, for example, when only a MAC address is available as a fingerprint. While a vendor may be identified easily, it may not be possible to find the type of device. MAC-based grouping may be used by some embodiments to predict the device type. In this case, the MAC-based grouping may predict the device as type "router," with a confidence score of 0.29 or 29%.

In the same embodiment, flowing from block 612, DNS data may be collected for 24 hours, and a network-based ML model may predict the device to be a "switch." In this case, the prediction that the device is a switch is more reliable than the prediction that it is a router, and in block 620, the DI results may be accepted. The foregoing example was encountered in an experimental test of the present system. In that case, researchers manually validated the domains the switch visited to confirm the prediction of the DNS-based model.

In another example of low confidence, in block 616, some devices are identified as "IoT" devices due to the lack of a fingerprint. For example, devices like Amazon Echo or Nest Thermostat often do not respond to discovery protocols that can be used to identify them. With DNS data, such devices can be accurately identified by categories such as voice assistant, thermostat, camera, smart lightbulb, or similar.

Returning to block 616, if the results are not low confidence, then in block 628, the system may inspect the results to see if they are inconsistent.

One illustrative example of inconsistent results identified experimentally was a case of DI matching with SI. A computer with a media streaming service (e.g., Spotify) may initially be identified as a media player by mDNS probes, whereas it is identified as a computer by the user agent probe. In this case, decision block 628 yields a "yes," because the results are inconsistent. In block 624, the system determines whether the DI results match any of the inconsistent results provided in block 628. In this case, DNS data collected over 24 hours showed that the device visited a variety of domain names and not simply the Spotify.com domain. The domains included news websites and social media, thereby indicating that the device is most likely a computer. Because this DI result matched at least one inconsistent result in block 628, then control flows to block 632. In this case, the system reconciles inconsistent results. In the case where there are inconsistent results in block 628, but a DI result matches at least one result in block 624, the reconcile may be accepting the results that match between the SI and the DI probes.

It is also possible to have a case where the DI results do not match any of the inconsistent SI results in block 628. In one example, a wireless speaker may be correctly identified using static discovery probes. However, when the device is compromised, the speaker may be seen visiting unexpected domains, such as public forums and others that may appear to be digitally generated. With medium confidence, DI classifies this device as a headful device.

In this case, in block 694, the results are identified as suspicious. When suspicious results are identified, appropriate remedial action may be taken.

Returning to block 628, if SI does not yield inconsistent results, then control may pass to decision block 636.

In decision block 636, the system checks whether SI provided consistent high confidence results. In other words, the SI probes are consistent with one another, and the results provided are high confidence.

If there are not consistent high confidence results, then in block 644, the identification fails. In other words, the device was not able to be correctly identified via SI. In some cases, a DI identification may be made, and may be reconciled over time. After ID fails, in block 690, the method is done.

Returning to block 636, if the SI probes yield consistent high confidence results, then in block 640, the system checks whether the DI results match those consistent HC results from static identification.

If the results do not match, then in block 694, the identification and the device may be treated as suspicious. For example, if the device is compromised or malicious, it may provide consistent high confidence results to the probes, but these results may be deceptive. If the dynamic identification of block 612 yields different results from these consistent HC results, then it is likely that the device is deliberately misidentifying itself. In that case, the device can be treated as suspicious, and appropriate remedial action may be taken.

Returning to block 640, if the consistent high confidence results match the dynamic identification results, then in block 648, the matching results can be used, and the device can be treated as having a consistent and high confidence identification that has been initially identified by SI methods, and that has been verified over time by DI methods. In this case, the device may be treated as trusted, and may be permitted to operate on the network according to its intended function.

In block 690, the method is done.

Figure 7:
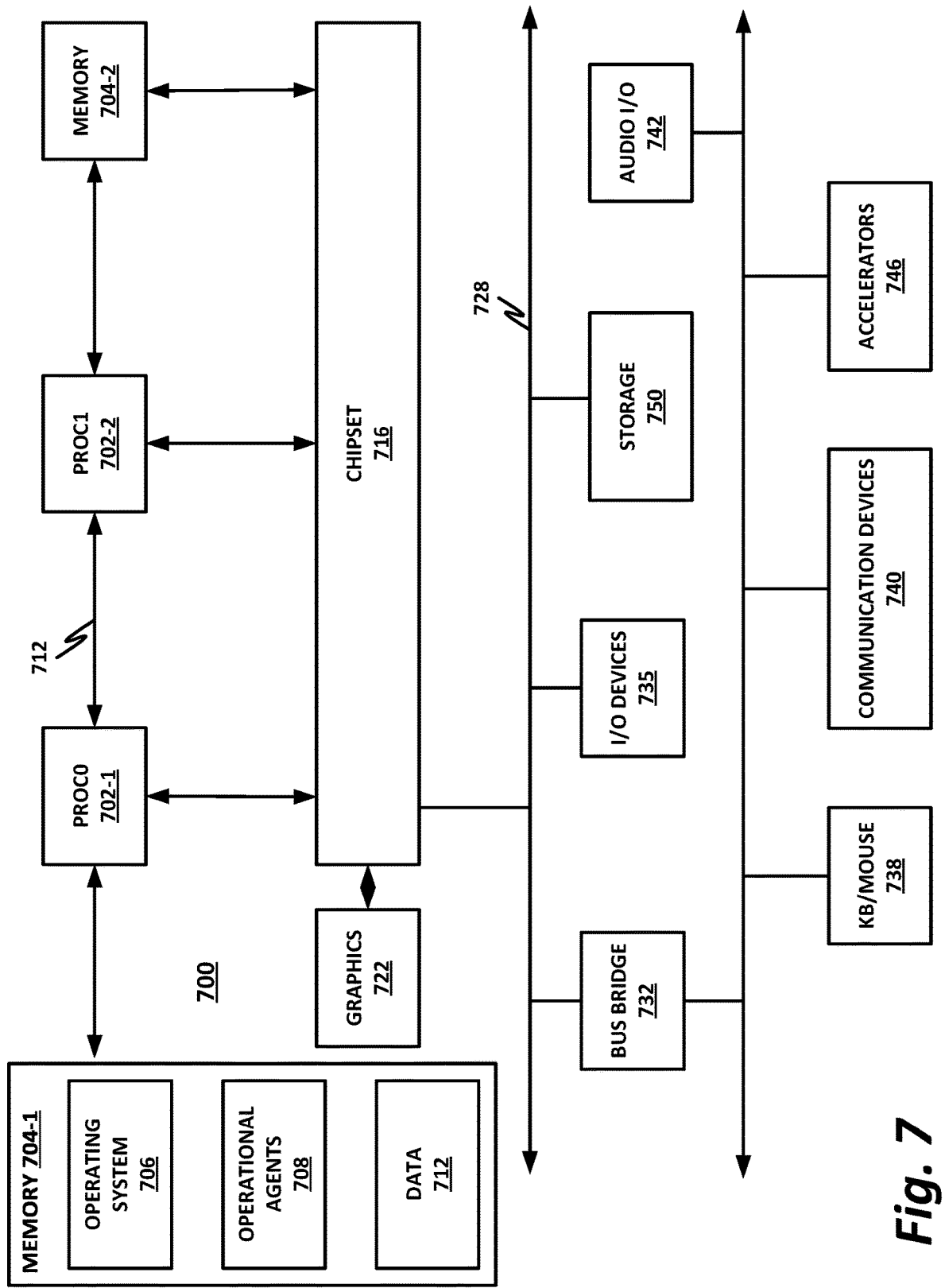
FIG. 7 is a block diagram of selected elements of a hardware platform.

FIG. 7 is a block diagram of a hardware platform 700. In at least some embodiments, hardware platform 700 may be configured or adapted to provide device identification, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Figure 9:
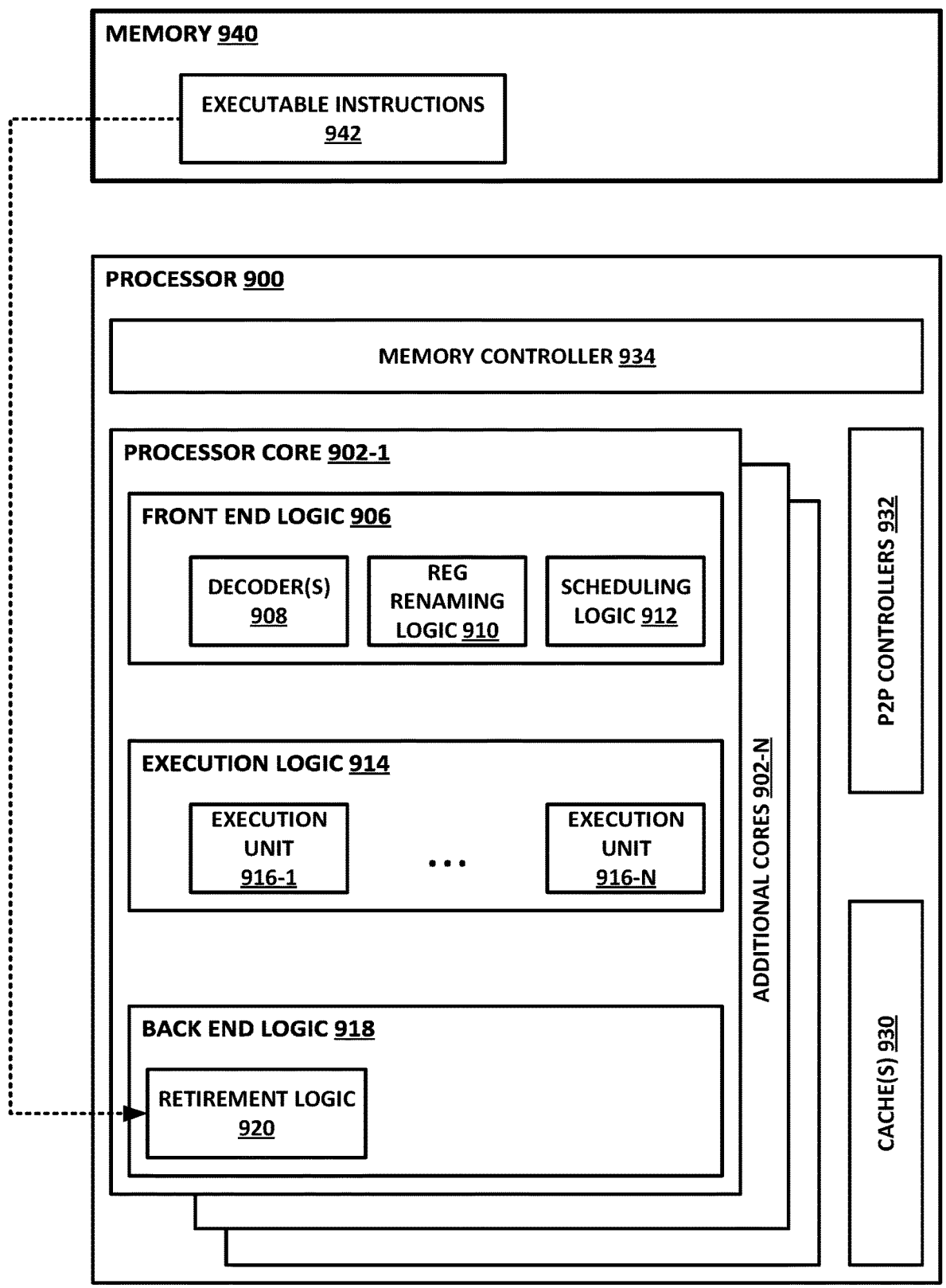
FIG. 9 is a block diagram of selected elements of a processor.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE, but one embodiment is illustrated in FIG. 9. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more central processor units (CPUs).

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with processor 710 via a bus. For example, some memories may be connected via a system bus, or in a data center, memory may be accessible in a remote DMA (RDMA) configuration.

Memory 704 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various universal serial bus (USB), FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, a data storage device 744, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more non-transitory computer-readable mediums having stored thereon executable instructions operable to instruct a processor to provide operational functions. At an appropriate time, such as upon booting hardware platform 700 or upon a command from operating system 706 or a user or security administrator, processor 702 may retrieve a copy of the operational agent (or software portions thereof) from storage 750 and load it into memory 704. Processor 710 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 8:
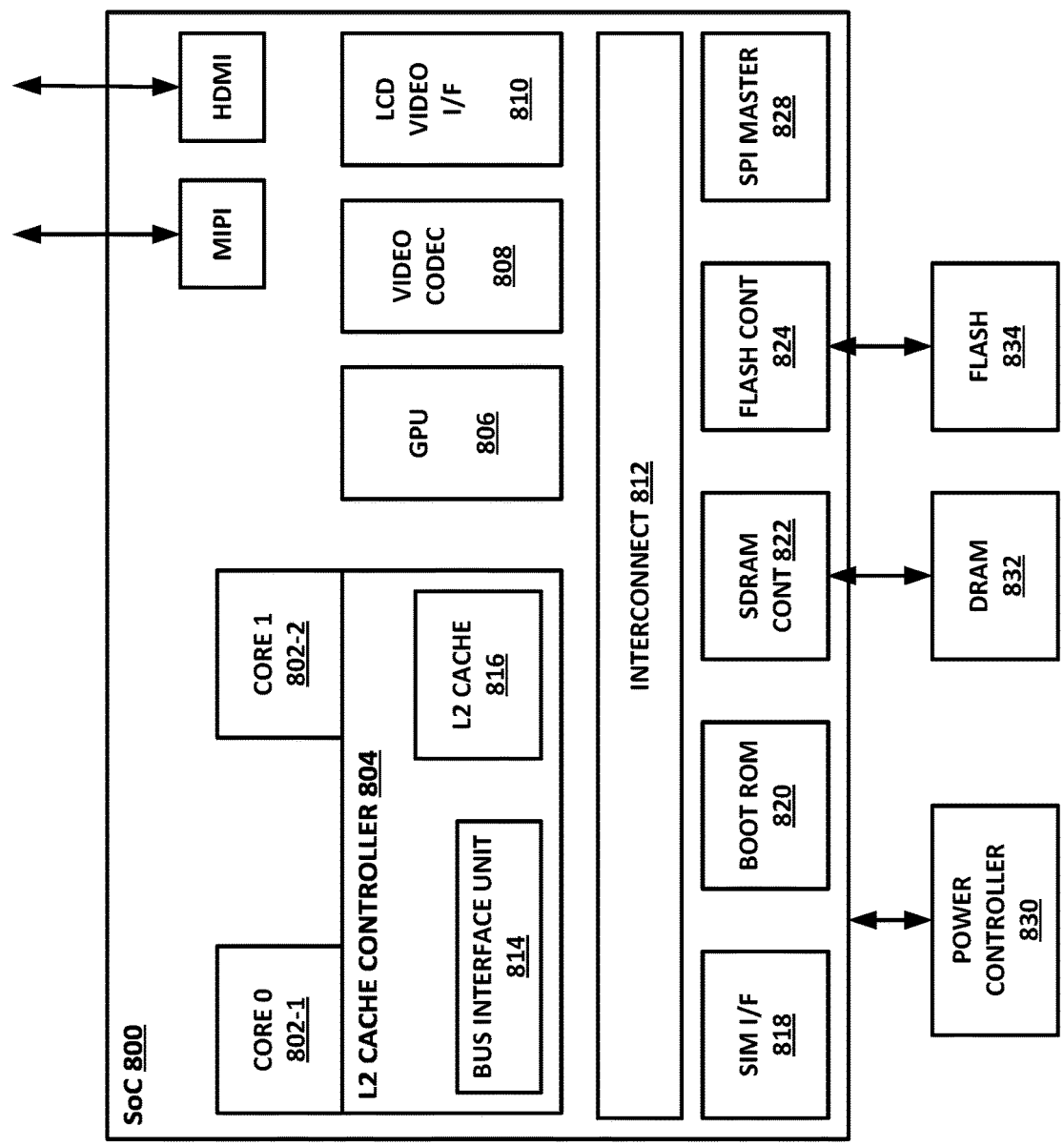
FIG. 8 is a block diagram of selected elements of a system-on-a-chip (SoC).

FIG. 8 is a block illustrating selected elements of an example SoC 800. In at least some embodiments, SoC 800 may be configured or adapted to provide device identification, according to the teachings of the present specification.

At least some of the teachings of the present specification may be embodied on an SoC 800, or may be paired with an SoC 800. SoC 800 may include, or may be paired with, an advanced reduced instruction-set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 800 could also be integrated into, for example, a PC, server, video processing components, laptop computer, notebook computer, netbook, or touch-enabled device.

As with hardware platform 700 above, SoC 800 may include multiple cores 802-1 and 802-2. In this illustrative example, SoC 800 also includes an L2 cache control 804, a GPU 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/HDMI links that couple to an LCD.

SoC 800 may also include a subscriber identity module (SIM) I/F 818, a boot ROM 820, a synchronous dynamic random access memory (SDRAM) controller 822, a flash controller 824, a serial peripheral interface (SPI) master 828, a suitable power control 830, a dynamic RAM (DRAM) 832, and flash 834. In addition, one or more embodiments include one or more communication capabilities, interfaces, and features such as instances of Bluetooth™ 836, a 3G modem 838, a global positioning system (GPS) 840, and an 802.11 Wi-Fi 842.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 9 is a block diagram illustrating selected elements of a processor 900. In at least some embodiments, processor 900 may be configured or adapted to provide device identification, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 900 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 900 includes one or more processor cores 902, including core 902-1-902-N. Cores 902 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 900 may include at least one shared cache 930, which may be treated logically as part of memory 940. Memory 940 may include executable instructions 942, as illustrated. Caches 930 may be filled according to known caching techniques, and may store instructions and/or data that may be used by one or more components of processor 900.

Processor 900 may include an integrated memory controller (MC) 934, to communicate with memory 940. Memory controller 934 may include logic and circuitry to interface with memory 940, and may also include a cache controller to handle filling and evicting instructions and data to and from cache 930.

By way of example, each core 902 may include front-end logic 906, execution logic 914, and backend logic 918.

In the illustrated embodiment, front-end logic 906 includes an instruction decoder or decoders 908, register renaming logic 910, and scheduling logic 912. Decoder 908 may decode instructions received. Register renaming logic 910 may provide register renaming, for example to facilitate pipelining. Scheduling logic 912 may schedule instruction execution, and may provide out-of-order (OOO) execution. Front-end logic 906 may fetch incoming instructions, perform various processing (e.g., caching, decoding, branch predicting, etc.), and pass instructions to execution logic 914.

Execution logic 914 includes one or more execution units 916-1-916-N. Execution units 916 may include hardware instructions and microcode to carry out the provided instructions.

Backend logic 918 includes retirement logic 920. Core 902 may provide for speculative execution of instructions, branch prediction, and similar. Retirement logic 920 may be configured to determine which predicted instructions were actually needed by the program flow.

Processor 900 may also include a PtP controller 932, which enables connection to an uncore, chipset, Northbridge, Southbridge, or bus, by way of example.

Figure 10:
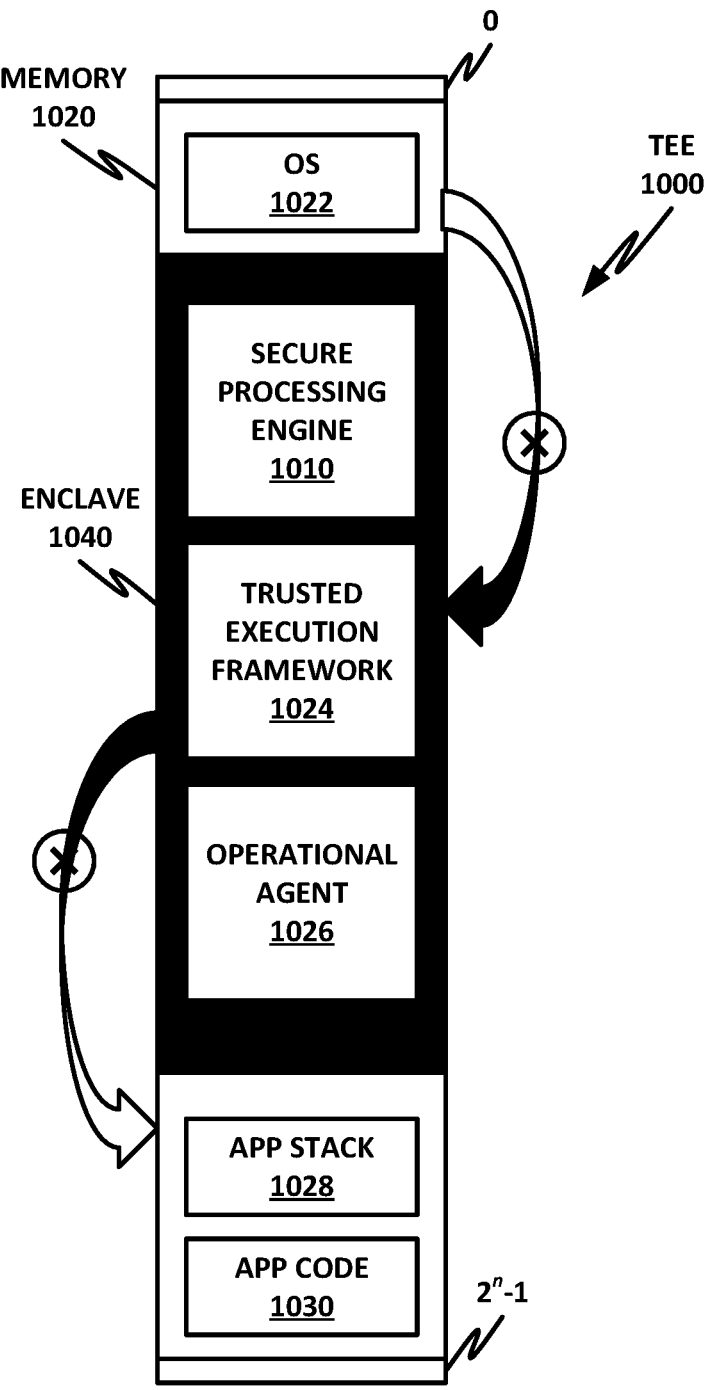
FIG. 10 is a block diagram of selected elements of a trusted execution environment (TEE).

FIG. 10 is a block diagram of a trusted execution environment (TEE) 1000. In at least some embodiments, device identification according to the teachings of the present specification may be provided within TEE 1000.

In the example of FIG. 10, memory 1020 is addressable by n-bits, ranging in address from 0 to $2^n-1$ (note, however, that in many cases, the size of the address space may far exceed the actual memory available). Within memory 1020 is an OS 1022, enclave 1040, application stack 1028, and application code 1030.

In this example, enclave 1040 is a specially-designated portion of memory 1020 that cannot be entered into or exited from except via special instructions, such as Intel® Software Guard Extensions (SGX™) or similar. Enclave 1040 is provided as an example of a secure environment which, in conjunction with a secure processing engine 1010, forms a TEE 1000 on a hardware platform such as platform 700 of FIG. 7. A TEE 1000 is a combination of hardware, software, and/or memory allocation that provides the ability to securely execute instructions without interference from outside processes, in a verifiable way. By way of example, TEE 1000 may include memory enclave 1040 or some other protected memory area, and a secure processing engine 1010, which includes hardware, software, and instructions for accessing and operating on enclave 1040. Nonlimiting examples of solutions that either are or that can provide a TEE include Intel® SGX™, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1010 may be a user-mode application that operates via trusted execution framework 1024 within enclave 1040. TEE 1000 may also conceptually include processor instructions that secure processing engine 1010 and trusted execution framework 1024 require to operate within enclave 1040.

Secure processing engine 1010 and trusted execution framework 1024 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1022 may be excluded from TCB, in addition to the regular application stack 1028 and application code 1030.

In certain systems, computing devices equipped with Intel® SGX™ or equivalent instructions may be capable of providing an enclave 1040. It should be noted, however, that many other examples of TEEs are available, and TEE 1000 is provided only as one example thereof. Other secure environments may include, by way of nonlimiting example, a virtual machine, sandbox, testbed, test machine, or other similar device or method for providing a TEE 1000.

In an example, enclave 1040 provides a protected memory area that cannot be accessed or manipulated by ordinary computer instructions. Enclave 1040 is described with particular reference to an Intel® SGX™ enclave by way of example, but it is intended that enclave 1040 encompass any secure processing area with suitable properties, regardless of whether it is called an "enclave."

One feature of an enclave is that once an enclave region 1040 of memory 1020 is defined, as illustrated, a program pointer cannot enter or exit enclave 1040 without the use of special enclave instructions or directives, such as those provided by Intel® SGX™ architecture. For example, SGX™ processors provide the ENCLU[EENTER], ENCLU [ERESUME], and ENCLU[EEXIT]. These are the only instructions that may legitimately enter into or exit from enclave 1040.

Thus, once enclave 1040 is defined in memory 704, a program executing within enclave 1040 may be safely verified to not operate outside of its bounds. This security feature means that secure processing engine 1010 is verifiably local to enclave 1040. Thus, when an untrusted packet provides its content to be rendered with trusted execution framework 1024 of enclave 1040, the result of the rendering is verified as secure.

Enclave 1040 may also digitally sign its output, which provides a verifiable means of ensuring that content has not been tampered with or modified since being rendered by secure processing engine 1010. A digital signature provided by enclave 1040 is unique to enclave 1040 and is unique to the hardware of the device hosting enclave 1040.

Figure 11:
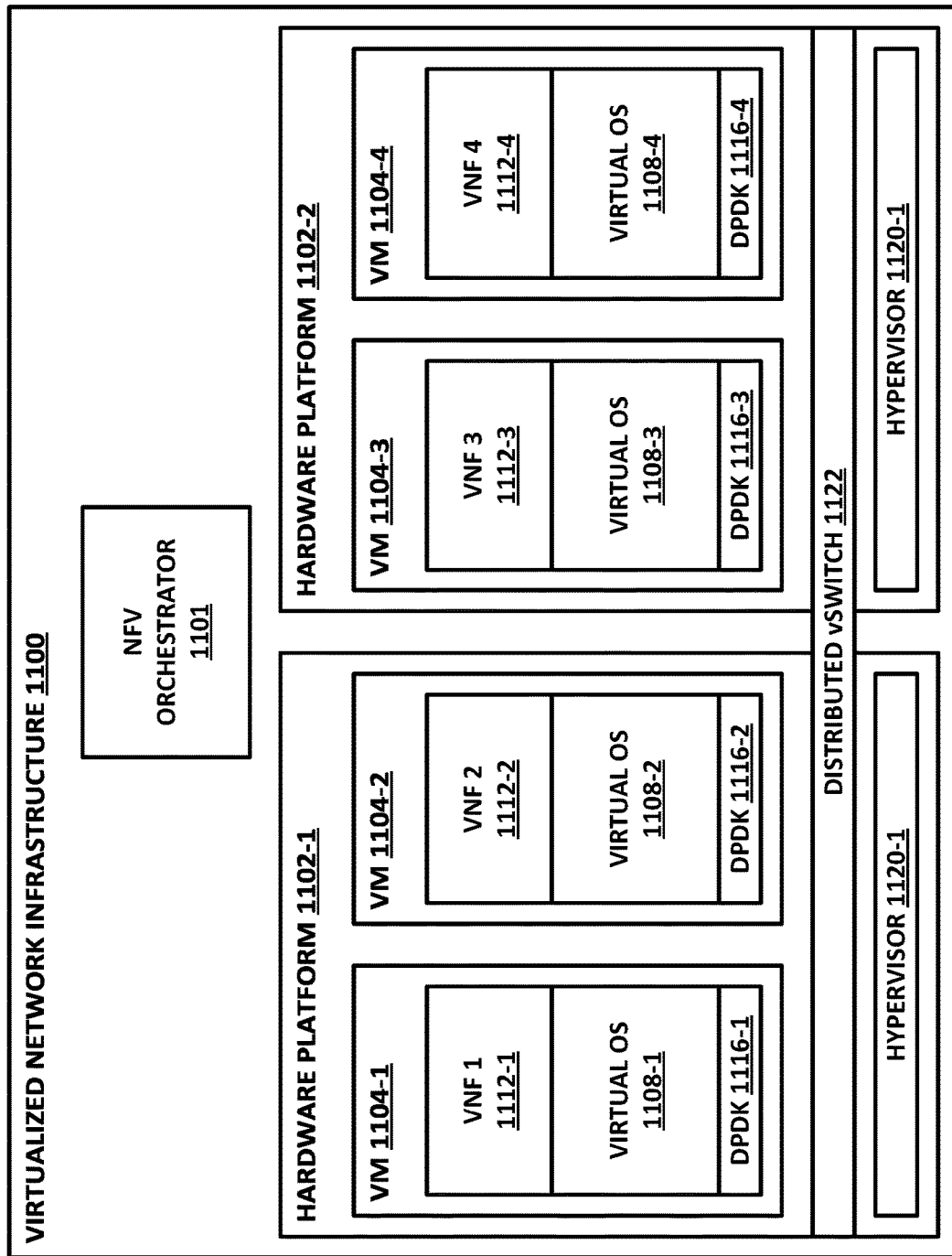
FIG. 11 is a block diagram of selected elements of a network function virtualization (NFV) infrastructure.

FIG. 11 is a block diagram of a network function virtualization (NFV) infrastructure 1100. In at least some embodiments, device identification according to the teachings of the present specification may be provided within NFV 1100.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or DPI appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a nonoperational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel® 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a computing apparatus, comprising: a hardware platform comprising a processor and a memory; a network interface to communicatively couple to a network; and a network gateway engine to identify devices on the network, the network gateway engine comprising instructions encoded within the memory to instruct the processor to provide two-phase identification for a device newly-identified on the network, comprising: a static identification phase comprising applying discovery probes to the newly-identified device; and a dynamic identification phase comprising collecting network telemetry for the newly-identified device over time and analyzing the collected network telemetry to determine if the network telemetry is consistent with expected network usage for the newly-discovered device.

There is further disclosed an example computing apparatus, wherein the gateway engine is a home gateway engine, and wherein the network is a home network.

There is further disclosed an example computing apparatus, wherein the instructions are further to determine that the newly-identified device has provided a certified identification, and to forego the two-phase identification.

There is further disclosed an example computing apparatus, wherein the instructions are further to reconcile results from the static identification phase and the dynamic identification phase.

There is further disclosed an example computing apparatus, wherein reconciling comprises determining that the static identification phase yielded no result or a low-confidence result, and applying results from the dynamic identification phase.

There is further disclosed an example computing apparatus, wherein reconciling comprises determining that the static identification phase yielded inconsistent results, determining that at least one result from the dynamic identification phase matches at least one of the inconsistent results, and selecting the at least one matching result.

There is further disclosed an example computing apparatus, wherein reconciling comprises determining that the static identification phase yielded inconsistent results, determining that no results from the dynamic identification phase match any of the inconsistent results, and marking the newly-identified device as suspicious.

There is further disclosed an example computing apparatus, wherein reconciling comprises determining that the static identification phase yielded consistent and high-confidence results, determining that the dynamic identification phase yielded high-confidence results that substantially match the consistent and high-confidence results of the static identification phase, and marking the newly-identified device as trusted.

There is further disclosed an example computing apparatus, wherein reconciling comprises determining that the static identification phase yielded consistent and high-confidence results, determining that the dynamic identification phase yielded high-confidence results that do not match the consistent and high-confidence results of the static identification phase, and marking the newly-identified device as suspicious.

There is further disclosed an example computing apparatus, wherein the instructions are further to periodically renew the dynamic identification phase.

There is further disclosed an example computing apparatus, wherein the static identification phase comprises a probe selected from the group consisting of multicast domain name server (mDNS), universal plug and play (UPnP), hypertext transfer protocol (HTTP) user agent, and dynamic host configuration protocol (DHCP) parameter request list option 55.

There is further disclosed an example computing apparatus, wherein the dynamic identification phase comprises monitoring domains visited or traffic patterns.

There is further disclosed an example computing apparatus, wherein providing the identification for the newly-identified device on the network comprises assigning a {type, manufacturer, model} tuple to the device.

There is further disclosed an example computing apparatus, wherein the instructions are further to assign a confidence score to the tuple.

There is also disclosed an example of one or more tangible, non-transitory computer-readable storage media having stored thereon executable instructions to: connect to a home network; identify a new device on the home network; perform a first-stage identification of the new device, the first-stage identification comprising active probing of the new device; perform a second-stage identification of the new device, the second-stage identification comprising passive monitoring of the new device's network traffic; reconciling the first-stage identification with the second-stage identification; and assigning a device identification to the new device according to the reconciling.

There is further disclosed an example of one or more tangible, non-transitory computer-readable media, wherein the instructions are further to assign a confidence score to the device identification.

There is further disclosed an example of one or more tangible, non-transitory computer-readable media, wherein the device identification comprises a {type, manufacturer, model} tuple.

There is further disclosed an example of one or more tangible, non-transitory computer-readable media, wherein the first-stage identification comprises pattern matching.

There is further disclosed an example of one or more tangible, non-transitory computer-readable media, wherein the first-stage identification comprises machine learning.

There is further disclosed an example of one or more tangible, non-transitory computer-readable media, wherein the instructions are further to determine that the new device has provided a certified identification, and to forego the two-phase identification.

There is further disclosed an example of one or more tangible, non-transitory computer-readable media, wherein reconciling comprises determining that the first-stage identification yielded no result or a low-confidence result, and applying results from the second-stage identification.

There is further disclosed an example of one or more tangible, non-transitory computer-readable media, wherein reconciling comprises determining that the first-stage identification yielded inconsistent results, determining that at least one result from the second-stage identification matches at least one of the inconsistent results, and selecting the at least one matching result.

There is further disclosed an example of one or more tangible, non-transitory computer-readable media, wherein reconciling comprises determining that the first-stage identification yielded inconsistent results, determining that no results from the second-stage identification match any of the inconsistent results, and identifying the new device as suspicious.

There is further disclosed an example of one or more tangible, non-transitory computer-readable media, wherein reconciling comprises determining that the first-stage identification yielded consistent and high-confidence results, determining that the second-stage identification yielded high-confidence results that substantially match the consistent and high-confidence results of the first-stage identification, and marking the new device as trusted.

There is further disclosed an example of one or more tangible, non-transitory computer-readable media, wherein reconciling comprises determining that the first-stage identification yielded consistent and high-confidence results, determining that the second-stage identification yielded high-confidence results that do not match the consistent and high-confidence results of the first-stage identification, and marking the new device as suspicious.

There is further disclosed an example of one or more tangible, non-transitory computer-readable media, wherein the instructions are further to periodically renew the second-stage identification.

There is further disclosed an example of one or more tangible, non-transitory computer-readable media, wherein renewing the second-stage identification comprises waiting for a domain name system (DNS) timeout, and renewing after the DNS timeout.

There is further disclosed an example of one or more tangible, non-transitory computer-readable media, wherein the first-stage identification comprises a probe selected from the group consisting of multicast domain name server (mDNS), universal plug and play (UPnP), hypertext transfer protocol (HTTP) user agent, and dynamic host configuration protocol (DHCP) parameter request list option 55.

There is further disclosed an example of one or more tangible, non-transitory computer-readable media, wherein the second-stage identification comprises monitoring domains visited or traffic patterns.

There is also disclosed an example computer-implemented method, comprising: detecting an unidentified device on a home network; deriving a static identification for the unidentified device, comprising active probing of the unidentified device; assigning the unidentified device a provisional identity based on the static identification; deriving a dynamic identification for the unidentified device, comprising passive longer-term monitoring of network traffic patterns for the unidentified device; reconciling the provisional identity with the dynamic identification; assigning the device a reconciled identity; and assigning the device a security status based on the reconciled identity.

There is further disclosed an example method, further comprising assigning a confidence score to the reconciled identity.

There is further disclosed an example method, wherein the reconciled identity comprises a {type, manufacturer, model} tuple.

There is further disclosed an example method, wherein deriving a static identification comprises pattern matching.

There is further disclosed an example method, wherein static identification comprises machine learning.

There is further disclosed an example method, further comprising determining that the unidentified device has provided a certified identification, and foregoing the static identification and dynamic identification.

There is further disclosed an example method, wherein reconciling comprises determining that the static identification yielded no result or a low-confidence result, and applying results from the dynamic identification.

There is further disclosed an example method, wherein reconciling comprises determining that the static identification yielded inconsistent results, determining that at least one result from the dynamic identification matches at least one of the inconsistent results, and selecting the at least one matching result.

There is further disclosed an example method, wherein reconciling comprises determining that the static identification yielded inconsistent results, determining that no results from the dynamic identification match any of the inconsistent results, and identifying the device as suspicious.

There is further disclosed an example method, wherein reconciling comprises determining that the first-stage identification yielded consistent and high-confidence results, determining that the second-stage identification yielded high-confidence results that substantially match the consistent and high-confidence results of the static identification, and marking the new device as trusted.

There is further disclosed an example method wherein reconciling comprises determining that the static identification yielded consistent and high-confidence results, determining that the dynamic identification yielded high-confidence results that do not match the consistent and high-confidence results of the static identification, and marking the new device as suspicious.

There is further disclosed an example method, further comprising periodically renewing the second-stage identification.

There is further disclosed an example method, wherein renewing the second-stage identification comprises waiting for a domain name system (DNS) timeout, and renewing after the DNS timeout.

There is further disclosed an example method, wherein the first-stage identification comprises a probe selected from the group consisting of multicast domain name server (mDNS), universal plug and play (UPnP), hypertext transfer protocol (HTTP) user agent, and dynamic host configuration protocol (DHCP) parameter request list option 55.

There is further disclosed an example method, wherein the second-stage identification comprises monitoring domains visited or traffic patterns.

There is further disclosed an example method, wherein the dynamic identification comprises monitoring domains visited or traffic patterns.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus, comprising:
   a hardware platform comprising a processor and a memory;
   a network interface to communicatively couple to a network; and
   a network gateway engine to identify devices on the network, the network gateway engine comprising instructions encoded within the memory to instruct the processor to provide two-phase identification for a device, comprising:
   a static identification phase comprising sending a discovery probe to the device, and receiving from the device self-reported identifying data in response to the discovery probe; and
   a dynamic identification phase comprising collecting network telemetry to provide behavioral data over time;
   the instructions further to receive from a deep learning model a predicted behavior of the device over time, the predicted behavior according to the self-reported identifying data compare the behavioral data to the predicted behavior, and after determining that the behavioral data mismatches the predicted behavior above a threshold, determine, with a confidence score, that the self-reported identifying data are false, and take a security action against the device based on the confidence score.

2. The computing apparatus of claim 1, wherein the network gateway engine is a home gateway engine, and wherein the network is a home network.

3. The computing apparatus of claim 1, wherein the instructions are further to determine that the device has provided a certified identification, and to forego the two-phase identification.

4. The computing apparatus of claim 1, wherein the instructions are further to reconcile results from the static identification phase and the dynamic identification phase.

5. The computing apparatus of claim 4, wherein reconciling comprises determining that the static identification phase yielded no result or a low-confidence result, and applying results from the dynamic identification phase.

6. The computing apparatus of claim 4, wherein reconciling comprises determining that the static identification phase yielded inconsistent results, determining that at least one result from the dynamic identification phase matches at least one of the inconsistent results, and selecting the at least one matching result.

7. The computing apparatus of claim 4, wherein reconciling comprises determining that the static identification phase yielded inconsistent results, determining that no results from the dynamic identification phase match any of the inconsistent results, and marking the device as suspicious.

8. The computing apparatus of claim 4, wherein reconciling comprises determining that the static identification phase yielded consistent and high-confidence results, determining that the dynamic identification phase yielded high-confidence results that substantially match the consistent and high-confidence results of the static identification phase, and marking the device as trusted.

9. The computing apparatus of claim 4, wherein reconciling comprises determining that the static identification phase yielded consistent and high-confidence results, determining that the dynamic identification phase yielded high-confidence results that do not match the consistent and high-confidence results of the static identification phase, and marking the device as suspicious.

10. The computing apparatus of claim 1, wherein the instructions are further to periodically renew the dynamic identification phase.

11. The computing apparatus of claim 1, wherein the static identification phase comprises a probe selected from the group consisting of multicast domain name server (mDNS), universal plug and play (UPnP), hypertext transfer protocol (HTTP) user agent, and dynamic host configuration protocol (DHCP) parameter request list option 55.

12. The computing apparatus of claim 1, wherein the dynamic identification phase comprises monitoring domains visited or traffic patterns.

13. One or more tangible, non-transitory computer-readable storage media having stored thereon executable instructions to:
    connect to a home network;
    perform a first-stage identification of a device, the first-stage identification comprising, upon newly identifying the device, sending a discovery probe to the device, and receiving from the device a first-stage identity comprising self-reported identifying data in response to the discovery probe;
    perform a second-stage identification of the device, the second-stage identification comprising passive monitoring of the device's network traffic to determine behavior of the device over time;
    infer from a deep learning model a second-stage identity of the device according to the behavior of the device over time;
    upon determining that the first-stage identity and the second stage identity are a mismatch, reconcile the first-stage identity and second-stage identity to provide a reconciled identity with an associated confidence score, determine that the first-stage identity is false based on the confidence score, and take a security action against the device according to the reconciled identity.

14. The one or more tangible, non-transitory computer-readable media of claim 13, wherein the self-reported identifying data comprise a {type, manufacturer, model} tuple.

15. The one or more tangible, non-transitory computer-readable media of claim 13, wherein receiving the first-stage identity comprises pattern matching.

16. A computer-implemented method, comprising:
    detecting a device on a home network;
    deriving a static identity for the device, comprising, upon newly identifying the device, sending a discovery probe to the device, and receiving from the device self-reported identifying data in response to the discovery probe;
    assigning the device a provisional identity based on the static identification;
    deriving dynamic identity for the device from dynamic identification data, comprising passive longer-term monitoring of network traffic patterns for the device;
    comparing the dynamic identification data to an expected longer-term network traffic pattern for the static identification according to a trained deep learning model;
    determining that the static identity and dynamic identity do not match, reconciling the static identity with the dynamic identity to provide the device a reconciled identity with a confidence score;
    assigning the device a security status based on the confidence score; and
    acting on the security status.

17. The method of claim 16, further comprising periodically renewing the dynamic identification.

* * * * *